Patented Aug. 9, 1932

1,871,056

UNITED STATES PATENT OFFICE

HAROLD W. HEISER, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA

PRODUCTION OF BARIUM ALUMINATE

No Drawing.  Application filed April 20, 1931.  Serial No. 531,645.

This invention relates to the production of soluble barium aluminate and it is particularly concerned with a method for producing from naturally occurring raw materials a product having a high percentage of soluble alumina and barium oxide. Alumina and barium oxide combine in different proportions to form the three barium aluminates known as mono-, di- and tribarium aluminate depending upon the relative amount of these substances present in the compound. However, the term "barium aluminate" is often used to define not only these three definite compounds, but also mixtures of these compounds with an excess of either alumina or barium oxide. The term "barium aluminate" is used herein and in the appended claims to denote the three definite compounds above mentioned and also mixtures of these compounds with each other and with excess amounts of either alumina or barium oxide.

It is an object of this invention to produce from naturally occurring ores, such as bauxite and barytes, a product containing a sufficiently high percentage of soluble barium aluminate to permit its use without further purification, in the treatment of water.

It is a further object of this invention to obtain a product of the type described, by a furnacing method without the necessity of using a reducing agent, such as finely divided carbonaceous material, which tends to increase the impurities in the final product.

Heretofore it has been customary, in the production of barium aluminate by furnacing methods, to intimately mix with finely divided alumina-bearing material and the baryta-bearing material, a reducing agent such as finely divided carbonaceous material, and to subject the mixture to a temperature of 600° to 1000° centigrade. More recently a method has been described in which a mixture of relatively pure alumina and barium sulphate in a finely divided state, heated to a temperature of about 1300° to 1400° centigrade, without the addition of any reducing agent, will produce a soluble product of tribarium aluminate. In the course of an extended experimental investigation of this latter method, I have found that a satisfactory commercial product of soluble barium aluminate cannot be obtained when naturally occurring ores, such as bauxite and barytes, are used as the raw materials. Under such conditions, the resulting product, according to my observations, is less than 50 per cent soluble and is, therefore, entirely unsatisfactory for use in water treatment.

I have discovered, however, that a satisfactory commercial product may be obtained by furnacing together bauxite and barytes without the addition of a reducing agent, if the finely divided raw materials are briquetted before the furnacing operation. According to my invention, the raw materials are first ground to a fineness of about 100 mesh and intimately mixed. The mixture is then moistened sufficiently for good briquetting with a solution of a bonding agent or agents. Briquettes formed of this moistened material are dried and heated to a temperature as high as possible without fusing the material. There is obtained in this manner a dark colored, friable briquette which contains 70 to 85 per cent of soluble barium aluminate.

The briquetted raw material, when heated to about 1400° centigrade, exhibits a surface combustion effect and the briquettes become white hot. This is a phenomenon which is not observed when the unbriquetted finely divided material is heated to the same temperature, and it is perhaps the explanation of the marked success of my process over those heretofore described. It seems probable that this phenomenon may be caused by the fact that the reaction between bauxite and barytes is only capable of proceeding exothermically, at temperatures of 1400° centigrade, when the reacting materials are in an intimately compacted form so that the heat developed by the exothermic reaction may be transferred from particle to particle throughout the whole mass. Whether or not this is the true explanation of the phenomenon taking place, it is immaterial to a complete understanding of my invention or the practice thereof.

A further advantage accruing from my method of making barium aluminate is the reduction of dust losses to a minimum and the consequent conservation of raw materials. In heating a mixture of finely divided bauxite and barytes, particularly in a rotary kiln as has been the custom in the past, a large amount of raw material (particularly the relatively light bauxite) is lost from the kiln in the form of dust. Such loss, which materially reduces the efficiency of the process, is substantially prevented by briquetting.

In practicing my invention, the proportions of bauxite and barytes to be used depend upon the percentage of alumina and of barium sulphate present in the respective ores, and upon the relative proportions of barium oxide and alumina desired in the barium aluminate to be produced. I have found it most satisfactory, however, for the production of a highly soluble commercial product, to use a proportion of one part of bauxite to three parts of barytes. From mixtures containing these proportions, I have been able to produce a soluble product containing two to three parts of soluble barium oxide to one part of soluble alumina.

The intimately mixed bauxite and barytes mixture may be briquetted by moistening with a solution of any suitable bonding agent, but for this purpose I prefer an inorganic agent which will not materially contaminate the final product. As a bonding agent, I have found that sodium hydroxide or aluminum sulphate or other aluminous materials such as sodium or barium aluminate may be used to advantage. I prefer, however, to use sodium hydroxide and in an amount equivalent to about 1 to 2 per cent of the dry weight of the raw materials. It is important in the briquetting operation that the raw materials have the proper degree of dampness and I have found that a mixture containing about 5 to 10 per cent of moisture is well adapted to good briquetting. It is most desirable, therefore, to use a solution containing about 15 per cent by weight of sodium hydroxide as the briquetting agent, as such a solution lends itself readily to imparting the proper degree of moisture and the proper percentage of bonding agent to the bauxite-barytes mixture. Briquettes formed in this manner, when dried at 110° centigrade, are quite hard and firm and retain their shape well during the subsequent heating and conversion into barium aluminate.

The briquettes are heated in any suitable type of furnace, but preferably in a rotary kiln, to a temperature of at least 1400° centigrade. The temperature should not, however, be permitted to exceed the temperature at which the briquettes fuse, as the fused product will react with the refractory furnace lining, thereby causing a reduction in the yield of barium aluminate and impairing the efficiency of the kiln. It is preferred, therefore, to maintain the temperature between 1400° and 1450° centigrade. The period of heating will vary with the temperature used and with the relative proportions of bauxite and barytes present in the mix. The heating should be continued, however, until the reaction is complete, which is usually a period of several hours. The presence of sulphur trioxide in the furnace gases, by reason of the decomposition of the barium sulphate present in the mixture, may be taken as a measure of the completeness of the reaction.

As a specific example of the results which may be obtained by my method, a mixture of 1 part of bauxite containing about 61 per cent of alumina, and 3 parts of barytes containing about 98 per cent of barium sulphate was briquetted, using 3 quarts of a 15 per cent solution of sodium hydroxide per 100 pounds of dry ore mixture as the binding medium. The briquettes were heated in a reverberatory furnace for a period of four hours at a temperature of 1400° to 1450° centigrade. The resulting product contained 59 per cent of water-soluble barium oxide and 23.74 per cent of water-soluble alumina, or a total of 82.74 per cent of soluble barium aluminate.

I claim as my invention:

1. The method of producing soluble barium aluminate from bauxite and barytes which comprises finely grinding the ores, intimately mixing the finely ground materials, moistening the mixture with a solution of inorganic bonding agent, forming briquettes of the material thus treated, and heating said briquettes to a temperature of at least 1400° centigrade.

2. The method of producing soluble barium aluminate from bauxite and barytes which comprises finely grinding the ores, intimately mixing the finely ground materials, moistening the mixture with a solution of sodium hydroxide, forming briquettes of the material thus treated and heating said briquettes to a temperature of at least 1400° centigrade.

3. The method of producing soluble barium aluminate from bauxite and barytes which comprises finely grinding the ores, intimately mixing the finely ground materials, moistening the mixture with a solution of sodium hydroxide in such amount as to incorporate in the material about 1 to 2 per cent of sodium hydroxide, forming briquettes of the material thus treated, and heating said briquettes to a temperature of at least 1400° centigrade.

4. The method of producing soluble barium aluminate from bauxite and barytes which comprises finely grinding the ores, intimately mixing the finely ground materials, moistening the mixture with a 15 per cent solution of sodium hydroxide, forming briquettes of the material thus treated, and heating said briquettes to a temperature of at least 1400° centigrade.

5. The method of producing soluble barium aluminate from bauxite and barytes which comprises finely grinding the ores, intimately mixing the finely ground materials, moistening the mixture with a 15 per cent solution of sodium hydroxide in such amount as to incorporate in the material about 1 to 2 per cent of sodium hydroxide, forming briquettes of the material thus treated, and heating said briquettes to a temperature of at least 1400° centigrade.

6. The method of producing soluble barium aluminate from bauxite and barytes which comprises finely grinding the ores, intimately mixing the finely ground materials, moistening the mixture with a solution of aluminum sulphate, forming briquettes of the material thus treated, and heating said briquettes to a temperature of at least 1400° centigrade.

7. The method of producing soluble barium aluminate which comprises intimately mixing one part of finely ground bauxite with three parts of finely ground barytes, moistening the mixture with a solution of inorganic bonding agent, forming briquettes of the material thus treated, and heating said briquettes to a temperature of at least 1400° centigrade.

8. The method of producing soluble barium aluminate from bauxite and barytes which comprises finely grinding the ores, intimately mixing the finely ground materials, moistening the mixture with a solution of an aluminous bonding agent, forming briquettes of the material thus treated, and heating said briquettes to a temperature of at least 1400° centigrade.

HAROLD W. HEISER.